Patented Jan. 18, 1927.

1,615,102

UNITED STATES PATENT OFFICE.

CARL GUSTAV SCHWALBE, OF EBERSWALDE, GERMANY.

METHOD OF UTILIZING WASTE SULPHITE CELLULOSE LYE.

No Drawing. Application filed January 21, 1925, Serial No. 3,807, and in Germany January 30, 1924.

My invention relates to an improved method of utilizing waste sulphite cellulose lye and more particularly to the art of carbonizing waste sulphite cellulose lye or the carbonizable constitutents thereof, properly speaking, for the purpose of producing thereby a valuable fuel.

It has been suggested heretofore to treat waste sulphite cellulose lye at high pressures and high temperatures or, as an alternative, by means of salt solutions at moderate temperature in order to produce a carbonaceous fuel.

After much study and research I have found that a ready carbonization of the waste lye or, properly speaking, of the carbonizable constituents thereof, can be brought about without the necessity of resorting to high temperatures or to the employment of salt solutions as heretofore proposed.

According to my invention the waste lye under treatment is mixed with a substance of large surface development or area such as charcoal, clay and the like adapted to absorb the liquid and produce an extensive surface contact, and the mixture is heated to a moderate temperature not exceeding 200° C. Preferably I inspissate the commercial waste lye by evaporation before I mix the same with the absorbing substance; at any rate, the subsequent heating causes the lye to decompose or carbonize in a quick and ready manner owing to the diffusion of the liquor over a large surface area. If desired or required a small percentage of a suitable acid may be added to the mixture before or during the heating operation.

Example. In a boiler or vessel of sufficient capacity 700 parts by weight of charcoal which may be obtained by carbonizing wood chips, bark or the like by means of a magnesium chloride solution, as in my application Serial No. 722,157, filed July 24, 1924, and 2000 parts by weight of condensed waste sulphite cellulose lye—corresponding to 8000 parts by weight of ordinary or commercial waste lye—are carefully mixed together by stirring or in any other suitable way until the mixture forms a pulpy or pasty mass to which a small quantity of hydrochloric acid, say 2 p. c. of the weight of the organic substances of the waste lye which may be determined by calculation, may be added, if desired. The hydrochloric acid causes a hydrolyzing action, which assists or promotes carbonization.

The vessel then is closed by means of an air-tight cover and appropriate closing and sealing devices, and heat is applied to the vessel in any suitable way and from any suitable source of heat until a temperature of about 180° C. is reached within the vessel. The temperature of 180° C. is maintained for four to eight hours according to the quality of the liquor under treatment whereupon the pressure in the vessel which generally speaking, will not exceed about 10 atmospheres, is released and the carbon produced in the vessel is partially removed therefrom. The vessel thereafter is ready for a next charge of waste sulphite cellulose lye and the subsequent carbonizing operation as described. It is to be noted that the carbon or charcoal produced in the vessel is adapted for use as a substance of large surface area to be mixed with the waste lye to be treated in the vessel and for this reason only part of the carbon or charcoal produced in the vessel in the manner above described, is removed from the vessel, the other part thereof remaining in the vessel in order to be used for the next charge, so that the absorption charcoal required for the process may always be obtained by the process itself.

The produced charcoal is granular in form, the grains being coarse and consequently can be readily separated from the liquid. It is not necessary to separate any ashy constituents (inorganic matter) enclosed in the charcoal from the latter since the product obtained has with such ashy constituents a heating value of 4000 to 5000 calories. It will thus be seen that not only the organic matter is removed from the liquor, but also the calcium oxide or lime.

As soon as pressure in the vessel is released a great amount of steam is evolved therein, which may be allowed to condense to form a distillate.

In the distillate thus obtained by the described process valuable substances are recovered such as methylic alcohol and sulfurous acid, and the carbon or coal produced by the process amounts to about 50 p. c. of the weight of the organic substances originally contained in the waste sulfite cellulose lye.

As above intimated other materials than absorption charcoal may be used for the purpose of my invention. Thus clay in the form of a muddy or miry mass or of solid porous pieces or balls both of which are the equivalents of carbon for my purpose and may be employed or kieselgur which also is a material of a large inner surface area, may be utilized according to my invention. In case of employing a material consisting of pulverized or fine particles the same must be constantly or intermittently stirred and agitated in the vessel by means of a stirring device or by moving the vessel in order that such particles will be kept suspended in the liquid.

I am aware of the fact that it has been proposed heretofore to condense waste sulphite cellulose lye in order to obtain a dry powder and to decompose the latter, upon addition of a certain quantity of charcoal, by dry distillation. I do not inspissate, however, the waste lye so far as to produce a dry powder nor do I decompose a solid mass by way of dry distillation at the usual high temperatures of 300° to 400° C. and still more which temperatures are unavoidable in case of dry distillation. Consequently my invention essentially differs from the prior art by the considerable reduction of the heat or temperatures and by thereby avoiding undue decomposition of the carbonaceous substances resulting from the waste lye under treatment.

Though I have described with great particularity of detail one way of carrying out my improved method, yet it is not to be understood that the invention is limited to the particular features set forth therein. It will rather be evident that my invention, whilst still being adhered to in its main essentials, may be varied and modified in many ways without departing from the spirit of my invention and the spirit and scope of the appended claims.

What I claim is:

1. A method of utilizing waste sulphite cellulose lye, consisting in mixing waste sulphite cellulose lye with an absorbent material and heating the mixture in a closed vessel for 4 to 8 hours at a temperature of about 180° C., and at a pressure not exceeding 10 atm.

2. A method of utilizing waste sulphite cellulose lye, consisting in mixing waste sulphite cellulose lye with an absorbent material offering a large inner surface area, adding to the mixture a small quantity of a mineral acid, and heating the thus acidulated mixture in a closed vessel for 4 to 8 hours at a temperature of about 180° C., and at a pressure not exceeding 10. atm.

3. A method of utilizing waste sulphite cellulose lye, consisting in mixing waste sulphite cellulose lye with carbonized vegetable matter, and heating the mixture in a closed vessel for 4 to 8 hours at a temperature of about 180° C., and at a pressure not exceeding 10 atm.

4. A method of utilizing waste sulphite cellulose lye, consisting in mixing waste sulphite cellulose lye with carbonized wood chips, adding to the mixture a small quantity of a mineral acid, and heating the thus acidulated mixture in a closed vessel for 4 to 8 hours at a temperature of about 180° C., and at a pressure not exceeding 10 atm.

CARL GUSTAV SCHWALBE.